(12) United States Patent
Engel et al.

(10) Patent No.: US 7,889,194 B2
(45) Date of Patent: Feb. 15, 2011

(54) SYSTEM AND METHOD FOR IN-CONTEXT MPR VISUALIZATION USING VIRTUAL INCISION VOLUME VISUALIZATION

(75) Inventors: Klaus Engel, Donauwörth (DE); James Williams, Nürnberg (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 699 days.

(21) Appl. No.: 11/684,685

(22) Filed: Mar. 12, 2007

(65) Prior Publication Data

US 2007/0229500 A1 Oct. 4, 2007

Related U.S. Application Data

(60) Provisional application No. 60/787,302, filed on Mar. 30, 2006.

(51) Int. Cl.
*G06T 15/00* (2006.01)
(52) U.S. Cl. ............ 345/419; 345/420; 345/422; 345/424; 345/427; 345/620; 382/128; 382/131; 382/154; 428/141; 428/323; 600/407; 600/425
(58) Field of Classification Search .......... 345/419, 345/420, 422, 424, 427, 620, 426; 382/128, 382/131, 154; 428/141, 323; 600/407, 425
See application file for complete search history.

(56) References Cited

U.S. PATENT DOCUMENTS

| | | | | |
|---|---|---|---|---|
| 4,835,712 A | * | 5/1989 | Drebin et al. | 345/423 |
| 5,313,567 A | * | 5/1994 | Civanlar et al. | 345/424 |
| 6,229,547 B1 | * | 5/2001 | Grzeszczuk | 345/419 |
| 6,674,430 B1 | * | 1/2004 | Kaufman et al. | 345/419 |
| 6,807,247 B2 | * | 10/2004 | Krishnan et al. | 378/4 |
| 7,098,915 B2 | * | 8/2006 | Appolloni | 345/427 |
| 7,133,041 B2 | * | 11/2006 | Kaufman et al. | 345/419 |
| 7,471,291 B2 | * | 12/2008 | Kaufman et al. | 345/424 |

(Continued)

OTHER PUBLICATIONS

Wu et al. "Shear-Image Order Ray Casting Volume Rendering", ACM proceeding 2003.*
Hadwiger et al. "High-Quality Two-Level Volume Rendering of Segmented Data Sets on Consumer Graphics Hardware", IEEE 2003.*

*Primary Examiner*—Kimbinh T Nguyen
(74) *Attorney, Agent, or Firm*—Donald B. Paschburg; F. Chau & Associates, LLC (57) ABSTRACT

A method for multi-planar reconstruction of digitized medical images includes providing an image volume, sampling the neighborhood about each point in a planar region and saving a color value and a depth, providing a projection plane onto which rendering rays are projected from a viewing point through said image volume, advancing sampling points along rays through the image volume, computing depths of each sampling point, determining for sampling points on rays that penetrates the planar region if a depth of said sampling point is less than the buffer depth of a corresponding point in the planar region and sampling neighborhoods of points about such sampling points, determining if sampling points are near said planar region, applying first transfer function to sample values interpolated from first volume for sampling points close to or inside the planar region, and otherwise applying second transfer function to sample values interpolated from second volume.

20 Claims, 5 Drawing Sheets

U.S. PATENT DOCUMENTS

2004/0138560 A1* 7/2004 Paladini .................. 600/437
2007/0201737 A1* 8/2007 Cai ........................ 382/131
2007/0276214 A1* 11/2007 Dachille et al. ............ 600/407
2009/0063118 A1* 3/2009 Dachille et al. ............ 703/11

* cited by examiner

SYSTEM AND METHOD FOR IN-CONTEXT MPR VISUALIZATION USING VIRTUAL INCISION VOLUME VISUALIZATION

CROSS REFERENCE TO RELATED UNITED STATES APPLICATIONS

This application claims priority from: "IN-CONTEXT MPR VISUALIZATION USING VIRTUAL INCISION VOLUME VISUALIZATION", U.S. Provisional Application Ser. No. 60/787,302 of Engel, et al., filed Mar. 30, 2006, the contents of which are incorporated herein by reference.

TECHNICAL FIELD

The present disclosure is directed to volume rendering, in particular to a method for in-context MPR visualization of a volume data set, whether magnetic resonance, computed tomography, ultrasound or volume data from any other imaging modality.

DISCUSSION OF THE RELATED ART

The underlying principle of direct volume rendering is to sample a volume dataset along rays through each pixel in a viewing direction and to blend these samples together in a frame buffer, which forms a 2-dimensional representation of the projection. Before being blended, the densities read in the volume are converted to colors (RGBA) with a transfer function that is often encoded as a lookup table. When a sufficient number of samples are involved, the result is a seamless image.

Even though direct volume rendering has become more popular in recent years, multi-planar reformatting (MPR) is still the most frequently used visualization method in diagnostic medical imaging. MPR algorithms reconstruct planar images through a volume data set at arbitrary orientation and position.

Multi-planar reconstruction (MPR) involves generating perspectives at right angles to a stack of axial slices so that coronal and sagittal images can be generated. It is helpful to consider the axial slices to be stacked one behind the other. A convention applied in medical imaging is to display axial image stacks with the axes oriented as so that the left side of an axial scan represents the patient's right side viewed from below, with their anterior surface at the top of the image. There are two types of orthogonal projections: a coronal reconstruction, and a sagittal reconstruction.

In a coronal reconstruction, an image stack is rotated so that the z-axis becomes the vertical axis and a stack of images is reconstructed using parallel planes of voxels arranged from the patient's anterior to posterior surface. The reconstructed slices are typically displayed from the patient's anterior to their posterior surface with the patient's head towards the top of the slices and their right hand side on the left of the slices.

In a sagittal reconstruction, additional rotations of the image stack are performed so that a patient's left-to-right slice sequence can be generated. The reconstructed slices are typically displayed from the patient's left to right side, with their head towards the top and their anterior surface towards the left of the slices. Note that a right-to-left sagittal stack can also be generated using additional geometric transformation of the data.

Coronal and sagittal reconstructions are referred to as Orthogonal MPRs because the perspectives generated are from planes of image data which are at right angles to each other. These can be combined with an axial projection, which involves integrating a number of axial images to display a composite which presents a three-dimensional impression of that volume of image data. A composite MPR display can be generated so that linked cursors or crosshairs can be used to locate a point of interest from all three perspectives. This form of image presentation is sometimes referred to as a TCS display, implying the viewing of transaxial, coronal and sagittal slices, and can be combined with standard slice projection methods, such as MIP or MinIP.

An oblique MPR is possible by defining angled planes through the voxel data. For example, the plane can be defined in the axial images and a maximum intensity projection can be used to display a reconstructed plane. This technique is useful when attempting to generate perspectives in cases where the visualization of three-dimensional structures is complicated by overlapping anatomical detail.

A curved MPR can be used for the reconstruction of more complex perspectives. For example, a curve can been positioned in the axial images to define a curved surface which extends through the voxel data in the z-direction, and voxels from this data can be reconstructed into a two-dimensional image. Note that more complex curves can be generated so that, for instance, the three-dimensional course of a major blood vessel can be isolated, or CT head scans can be planarized for orthodontic applications.

A final variant on the MPR theme is the generation of a three-dimensional display showing all three orthogonal projections combined so that a defined point of interest locates the intersection of the planes. The point of intersection is located for illustrative purposes at the center of the voxel data. It can typically be placed at any point in the 3D data using interactive controls. In addition, the perspective used for a rotating sequence can typically be manipulated interactively to improve the visualization of a region of interest. Note that slice projections (e.g. MIPs) can be combined with this form of display to provide additional perspectives on a feature of interest.

Direct volume renderings and MPRs are typically handled as completely different rendering results, i.e. MPRs and direct volume renderings are displayed in different segments on the screen, for example in a 2 by 2 layout with 3 orthogonal MPRs and one direct volume rendering. Consequently, it is often difficult to find corresponding features and the spatial relationship of anatomical structures on MPRs and in the direct volume rendering.

SUMMARY OF THE INVENTION

Exemplary embodiments of the invention as described herein generally include methods and systems for an efficient display technique for in-context visualization of multi-planar reconstructions (MPRs) in direct volume visualization. MPR images are embedded inside direct volume rendered images to combine the advantages of the 2D results from MPRs with the 3D results from direct volume rendering. A method according to an embodiment of this invention can render MPR images in the context of the surrounding material using a combination of direct volume rendering and MPR rendering. By manipulating the MPR the user can interactively modify an incision region to reveal the inside of the image volume and show the MPR in the context of the surrounding tissue and bones. In contrast to existing importance driver visualization methods that rely on segmentation information to define important features inside a volume data set, the MPR plane defines the part of the volume data set that is currently most important to the user. An in-context MPR visualization according to an embodiment of the invention does not require segmentation information.

According to an aspect of the invention, there is provided a method for multi-planar reconstruction of a digitized medical image including providing a digitized medical image volume, said image comprising a plurality of intensities on a 3-dimensional grid of points, providing a planar region inside said image volume in which a multi-planar reconstruction will be rendered, sampling the neighborhood about each point in said planar region wherein a color value for each said point and a depth of each said point within the image volume are saved in a buffer, providing a projection plane comprising a 2-dimensional lattice of points onto which rendering rays are projected from a viewing point through said image volume, advancing a sampling point along a ray through said image volume, computing a depth of said sampling point in said image volume, determining for a sampling point on a ray that penetrates said planar region if a depth of said sampling point is less than the buffer depth of a corresponding point in said planar region and sampling a neighborhood of points about such a sampling point, determining if said sampling point is near said planar region, wherein a first transfer function is applied to a sample value interpolated from a first volume if said sampling point is close to or inside the planar region, and a second transfer function is applied to a sample value interpolated from a second volume if said sampling point is not close to the planar region, and accumulating the output of the transfer function.

According to a further aspect of the invention, sampling the neighborhood about each point in said planar region comprises tri-linear interpolation.

According to a further aspect of the invention, the method comprises window leveling said interpolated sample values.

According to a further aspect of the invention, if a leveled luminosity of said sampled point is lower than a pre-determined threshold, the method includes discarding any such sampling points from the multi-planar reconstruction.

According to a further aspect of the invention, sampling a neighborhood of points about a sampling point whose depth is less than the buffer depth of a corresponding planar point comprises tri-linear interpolation.

According to a further aspect of the invention, the method comprises discarding a sampling point whose depth is greater than the buffer depth of the corresponding planar point.

According to a further aspect of the invention, the method comprises performing shading on the outputs of said transfer functions.

According to another aspect of the invention, there is provided a method of multi-planar reconstruction of a digitized medical image including providing a first digitized medical image volume, said image comprising a plurality of intensity data on a 3-dimensional grid of points, providing a planar region inside said first image volume in which a multi-planar reconstruction will be rendered, computing a depth for each point in said planar region and saving said depth value in a buffer associated with said planar region, providing a second digitized medical image volume, said image comprising a plurality of intensity data on a 3-dimensional grid of points, embedding said planar region from said first image volume within said second image volume, volume rendering said second digitized image volume, wherein a plurality of rays are projected from a viewing point through said second image volume wherein a sample output for sampling points along each ray is accumulated on a projection plane, determining, for each sampling point along each ray, whether said sampling point is near said planar region, wherein said sampling point is rendered with a first transfer function applied to first image data if said sampling point is close to or inside the planar region, and said sampling point is rendered with a second transfer function applied to second image data if said sampling point is not close to the planar region.

According to a further aspect of the invention, the method comprises determining for each sampling point along each ray that penetrates said planar region if a depth of said sampling point is less than the buffer depth of a corresponding point in said planar region and discarding a sampling point that does not satisfy said criteria.

According to a further aspect of the invention, the first image volume and the second image volume are acquired using differing imaging modalities.

According to a further aspect of the invention, the first image volume is acquired before performing a medical procedure, and said second image volume is acquired after performing said medical procedure.

According to a further aspect of the invention, the method comprises for a sampling point near to said planar region, rendering said sampling point with a third transfer function applied to second image data.

According to a further aspect of the invention, the method comprises interpolating an output on the boundary of said planar region with said second image volume from the output of said first transfer function and the output of the second transfer function.

According to another aspect of the invention, there is provided a program storage device readable by a computer, tangibly embodying a program of instructions executable by the computer to perform the method steps for multi-planar reconstruction of a digitized medical image.

DETAILED DESCRIPTION OF THE EXEMPLARY EMBODIMENTS

Exemplary embodiments of the invention as described herein generally include systems and methods for in-context MPR visualization using a virtual incision. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Multi-Planar Reformatting (MPR) is probably the most popular volume visualization method used in medical volume visualization. An MPR image shows volume data reconstructed on an arbitrarily oriented plane that cuts through the volume data. The volume data is usually inspected by interactively changing the position and orientation of the plane which defines the MPR image. However, only highly trained and experienced radiologists are able to mentally reconstruct the three-dimensional structures within the volume data from MPR images.

Methods to generate a two-dimensional image from volumetric data can roughly be classified into indirect and direct volume rendering techniques. While indirect methods generate and render an intermediate representation of the volume data, direct methods display the voxel data by evaluating an optical model which describes how the volume emits, reflects, scatters, absorbs and occludes light. The voxel values are mapped to physical quantities that describe light interaction at the respective points in 3D -space. During image synthesis, the light propagation is computed by integrating light interaction effects along viewing rays based on the optical model. The corresponding integral is known as the volume rendering integral. Hardware-accelerated methods using graphics processing units (GPUs) that employ texture-mapping hardware provide high frame rates and thus interactivity.

Interpolated volume data values are usually not rendered directly. Instead, a transfer function usually maps data values to colors and opacities. In the context of texture-based volume visualization, intermediate color and opacity values generated during volume rendering are called "fragments". By blending many fragments along straight rays through the volume, the final output color for a pixel on the screen in computed. Depending on the opacity values in the transfer function specified by the user, parts of the volume become visible, transparent or invisible. The inside of the volume is usually revealed during direct volume rendering by employing transfer functions which map material that occludes important features inside the volume to zero opacity. This however makes it impossible to see important features in the context of the surrounding material. The surrounding material might provide important clues on how the feature is embedded inside the volume.

Options for removing occluding features include clip planes, arbitrary clip geometries and segmentation masks. Clip planes remove all voxels in one of the two half-spaces defined by the plane. Clip geometries allow cutting away voxels inside or outside of a given geometric object, such as a polygonal model, thus providing higher flexibility than clip planes. Segmentation masks provide per-voxel tags, which allow rendering those voxels with a particular tag value using a different transfer function or by discarding such voxels entirely.

All these techniques remove occluding features, or at least make occluding features more transparent. Thus, the context in which an important occluded feature is embedded is lost or at least rendered less well-defined.

Importance-driven visualization methods prevent important features from being occluded by less important features by providing a per-voxel importance tag. Voxels with low importance are removed on-the-fly during rendering only if they occlude voxels with higher importance. Material is removed dynamically depending on the viewing direction, allowing for the visualization of important features in the context of the surrounding material. For interactive volume rendering, this improves the understanding of how features are embedded in the volume data.

Importance-driven visualization requires important features to be classified using segmentation algorithms, i.e. the importance of features must be pre-computed by segmentation algorithms that are typically time-consuming. In contrast to the common importance-driven in-context visualization algorithms, a virtual incision volume visualization does not require any segmentation information. In-context virtual incision volume visualization is described in these inventors' co-pending patent application, "SYSTEM AND METHOD FOR IN-CONTEXT VOLUME VISUALIZATION USING VIRTUAL INCISION", Ser. No. 11/675135, filed Feb. 15, 2007, the contents of which are herein incorporated by reference in their entirety.

The term "virtual incision volume visualization" refers to revealing the inside of a volume by virtually cutting it open by either discarding fragments inside an incision area (cutting away material), shifting fragments inside the incision area to the outside (deforming material), or using a different transfer function in the incision area (making occluding material transparent). The virtual incision area inside the volume is defined procedurally, in that there exists no explicit representation of the shape of the incision area in memory. Instead the incision area is determined during rendering "on-the-fly" using a procedural approach.

In many medical visualization applications, three orthogonal MPR planes and a direct volume rendering result are displayed in a four quadrant layout. The position of the MPRs inside the volume can be shown using lines that intersect the bounding box of the direct volume rendering result or by fusing the MPRs into the direct volume rendering result. Even using this technique, it is still challenging for a user to compare features visible in a MPR with features visible in the direct volume rendering result.

The idea of in-context MPR volume visualization is to fuse one or multiple MPRs into the direct volume rendering result and use the virtual incision volume rendering technique described above to cut away material close to the MPR plane. FIGS. 1(a)-(d) shows a selection of rendering results that are possible using a virtual incision technique according to an embodiment of the invention. The lower left and upper right images, FIGS. 1(c) and 1(b), respectively, show MPR in-context visualization only, while upper left and lower right images, FIGS. 1(a) and 1(d), respectively, show MPR in-context visualization plus two CPR renderings on the boundary of the incision area. The direct volume rendering image is fused with the MPR visualization correctly by comparing the depth of sampling points inside the direct volume rendering with the depth of the MPR plane.

Figure 1:
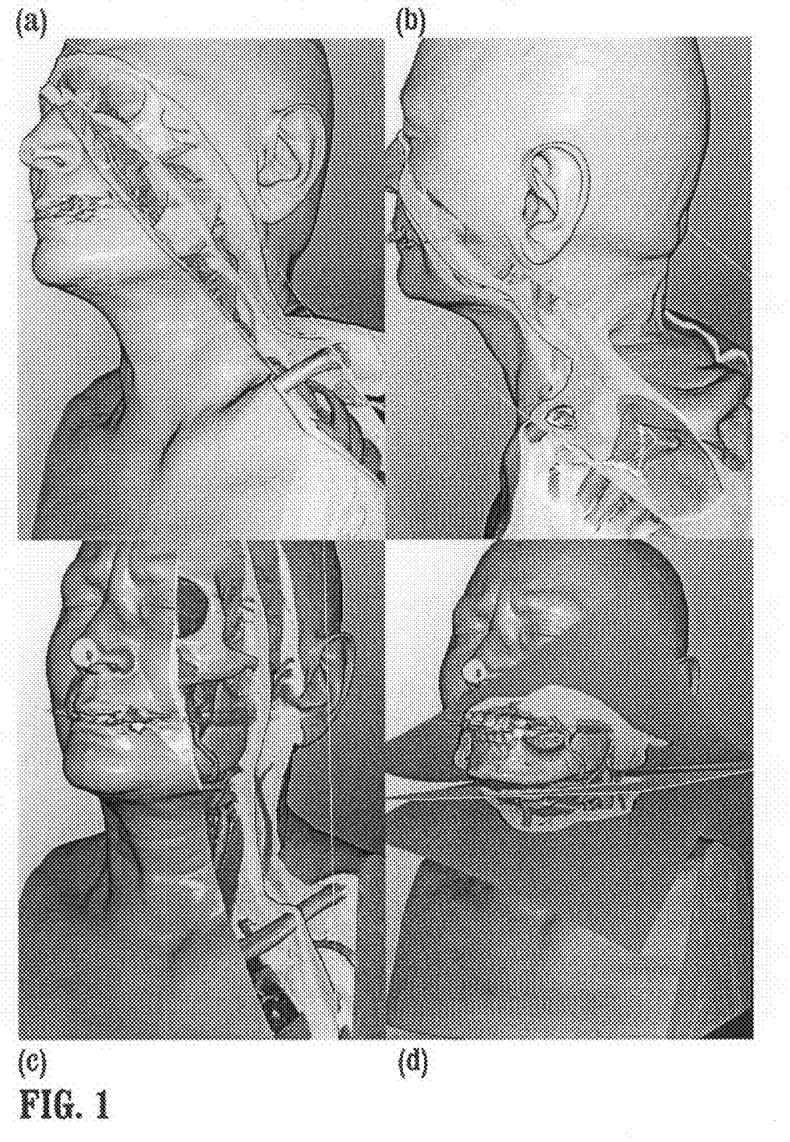
FIGS. 1(a)-(d) depicts rendering variations of in-context MPR visualization, according to an embodiment of the invention.
Figure 2:
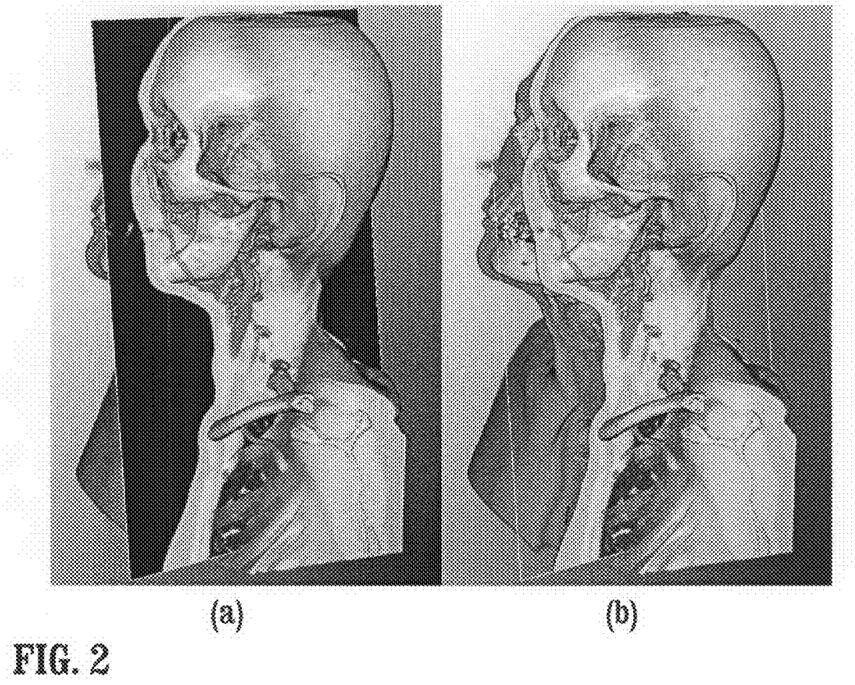
FIGS. 2(a)-(b) illustrates smooth interpolation of the transfer functions from inside and outside the incision area, according to an embodiment of the invention.

In order to reduce occlusion by the MPR plane that is fused to the direct volume rendering (DVR) result, low luminosity MPR pixels, for example black pixels, may be discarded or made transparent during rendering. FIGS. 2(a)-(b) show the difference between not discarding any MPR plane pixels (FIG. 2(a), left) and discarding black pixels on the MPR plane (FIG. 2(b), right). In contrast to the left image (FIG. 2(a)), low luminosity MPR pixels are discarded for the right image (FIG. 2(b)) to reduce occlusion.

Figure 3A:
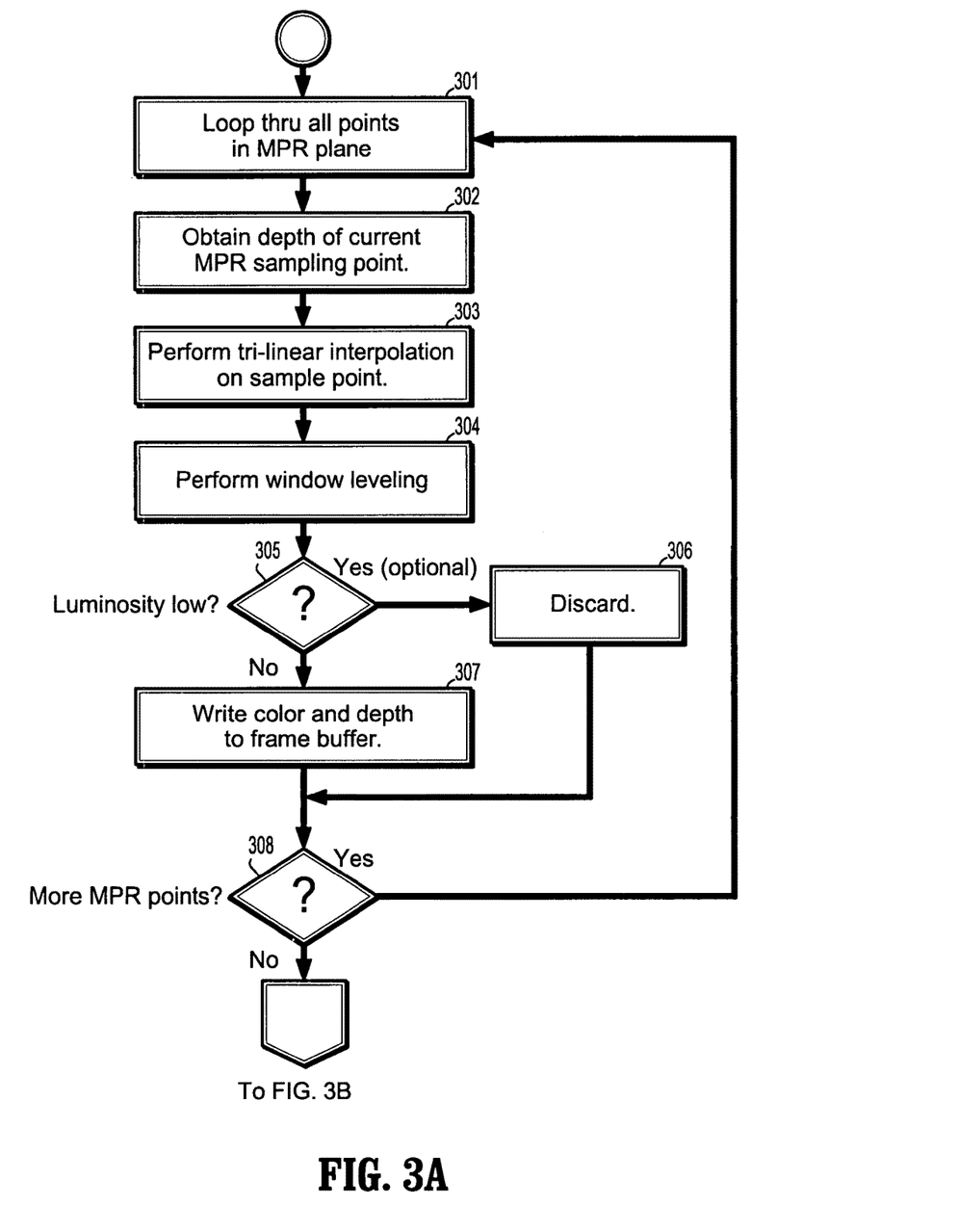
FIGS. 3(a)-(b) is a flow chart of in-context MPR visualization method according to an embodiment of the invention.
Figure 3B:
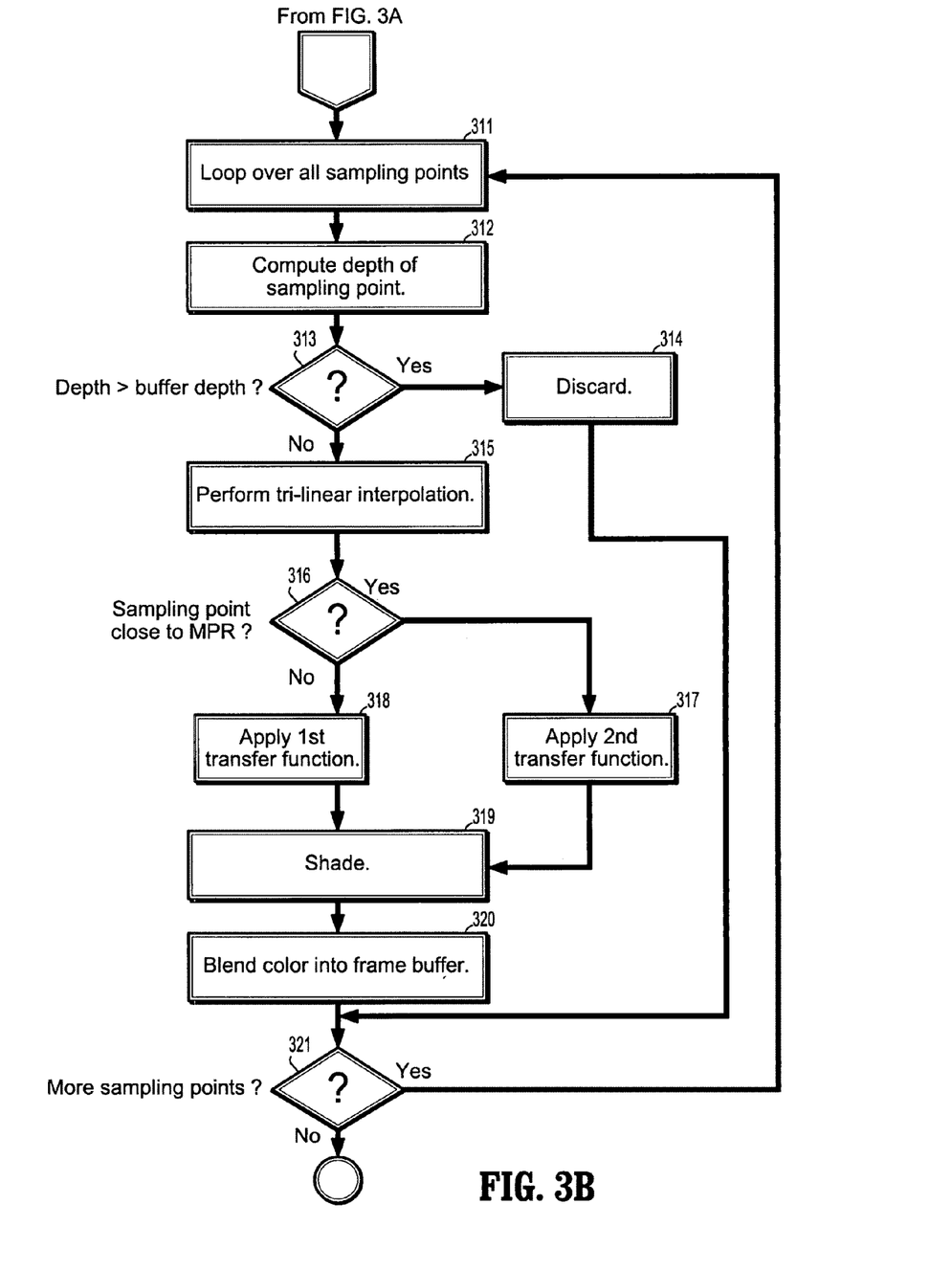

FIGS. 3a-b is a flowchart of an exemplary, non-limiting two pass implementation of the method according to an embodiment of the invention. In the first pass the MPR is rendered in 3D, while in the second pass the whole volume is rendered in 3D. To ensure that sampling points from the 2nd pass that are behind the MPR overwrite MPR sampling points, a depth buffer test is applied. A depth buffer (or Z-Buffer) is a technique in computer graphics that prevents scene objects in the background from overwriting scene objects in the foreground. For example, suppose there is a 3D scene of a town consisting of many individual houses. If one renders the scene house-by-house in no particular order, pixels from houses in the background would overwrite pixels from houses in the foreground. To prevent this, a depth value is written for each pixel. Before writing a pixel color, the depth of the current object is tested against the depth stored for the pixel. Only if the depth is smaller is the color is written to the pixel. According to an embodiment of the invention, it is desired to ensure that sampling points from the 2nd pass (the direct-volume rendering pass) that have a larger distance to the camera overwrite pixels from the 1st pass (the MPR pass) that are opaque and closer to the camera. Thus depth values are written for each pixel in the first pass and tested against those depth values in the 2nd pass.

Referring now to FIG. 3a, the MPR is rendered in a first pass where depth values are written. In the first pass (the MPR pass), a frame buffer is provided and the MPR plane is rendered into the frame buffer as a three-dimensional slice polygon intersecting the volume bounding box. The first pass begins at step 301 as a loop over all sampling points in the MPR plane. At step 302, the depth value of the current sampling point is obtained. The depth comes from the depth of the current sampling point in the 3D scene. The MPR is rendered as a planar surface in the 3D scene, with an implied camera or viewing point, thus each point on the MPR plane has an associated depth. Tri-linear interpolation is performed on the pixels neighboring the sampling point at step 303 to obtain an initial value to be associated with the sampling point, and a transfer function that maps the data value to a color and/or opacity is applied to this value at step 304 to adjust the color and brightness of the MPR plane. This adjustment is referred to as window leveling.

At step 305, the data value is tested for low luminosity. Pixels with low luminosity colors resulting from window leveling can be discarded at step 306 to reduce occlusion of the direction volume rendering results. This step is optional, and according to another embodiment of the invention, the luminosity test and discard steps are not performed.

At step 307, the color values as well as depth values are written into the frame buffer. Note that according to another embodiment of the invention, the depth value of the sampling point can be obtained as a part of this step. At step 308, if more MPR points remain to be rendered, the process returns to step 301, other wise the process proceeds to step 311 in FIG. 3b.

In the $2^{nd}$ pass, shown in FIG. 3b, the direct volume rendering result is fused into the result of the first pass by comparing the depth values of incoming fragments with the depth values stored during the MPR pass. The fusing of the MPR region into the volume rendering is analogous to the virtual incision disclosed in these inventor's co-pending application, "SYSTEM AND METHOD FOR IN-CONTEXT VOLUME VISUALIZATION USING VIRTUAL INCISION", incorporated above, in that the MPR region is treated like the incision region. Referring now to the figure, given a 3-dimensional image volume to render, a 2-dimensional frame buffer that represents an image projection plane is provided onto which rays will be projected from a viewing point. The direct volume rendering begins at step 311 with a loop over each pixel in the frame buffer, from which a ray is projected into the image volume Samples are computed along the ray through the image volume. At step 312, the depth of the current sampling point along a ray is computed. Not all rays pass through the MPR region, For those rays that do, before writing a color to the frame buffer, the depth of the current sampling point is tested at step 313 against the depth stored in the depth buffer, saved from the 1st pass, shown in FIG. 3a. Only fragments that are closer to the viewing point than MPR pixels are blended into the frame buffer. Thus, if the current sampling depth is smaller than the stored depth, tri-linear interpolation is performed at step 315. Otherwise, the current sampling point is discarded at step 314.

At step 316, it is determined whether the current sampling position is close to the MPR region. According to this embodiment of the invention, this determination is implemented as a Boolean function that returns TRUE or FALSE, and takes as arguments the current sampling position, the shape of the MPR region, and the parameters associated with the MPR region for making the determination. This function is substantially similar to that for determining whether a sampling point is within a virtual incision region, as described in these inventor's co-pending application, "SYSTEM AND METHOD FOR IN-CONTEXT VOLUME VISUALIZATION USING VIRTUAL INCISION", incorporated above. An exemplary determination is based on a distance threshold, where the distance of each sampling point to the MPR region is computed with a dot product. If the distance is smaller than e threshold, the sampling point is close to the MPR region. Fragments close to the MPR plane are rendered at step 317 with a second transfer function that is different to the primary transfer function used for rendering other fragments at step 318. After application of the transfer functions, shading is performed at step 319, where the influence of the light sources is computed. The resulting color is blended into the output color for that current ray in the frame buffer at step 320. At step 321, if there are more rays and sampling points, to be rendered, the process returns to step 311 to continue rendering, other wise it terminates.

A virtual incision technique according to an embodiment of the invention also permits other variants of rendering the area close to the MPR plane. For example, close to the MPR plane, a secondary volume (for example from another modality) can be rendered with its own transfer function. Further away from the MPR plane, the primary volume is rendered the 1st transfer function. For example, a positron emission tomography (PET) data set could be rendered inside the incision area that is close to the MPR plane.

As another example, close to the MPR plane, the primary volume is rendered with a $2^{nd}$ transfer function and a secondary volume (e.g. from another modality) is rendered with a $3^{rd}$ transfer function. Further away from the MPR plane, the primary volume is rendered with the $1^{st}$ transfer function.

In addition, pre- and post-operative volumes can be rendered. Close to the MPR plane, it is possible to render the post-operative volume, while further away from the MPR plane the pre-operative volume is rendered.

The transfer functions used for direct volume rendering close to the MPR plane and further away from the MPR plane can also be smoothly interpolated in the boundary of the incision region. The images shown in FIGS. 2(a)-(b) were produce in such a way. Referring to FIGS. 1(a)-(d) again, the lower right image, FIG. 1(d), and upper left image, FIG. 1(a), demonstrate that it is also possible to render the boundary around the incision area as a (curved) MPR plane.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

An application program implementing an embodiment of the invention can be written in any suitable computer language. However, at least one embodiment of the invention is adaptable to being implemented to execute on a graphics processing unit (GPU) using the OpenGL Shading Language (GLSL) as a source language.

Figure 4:
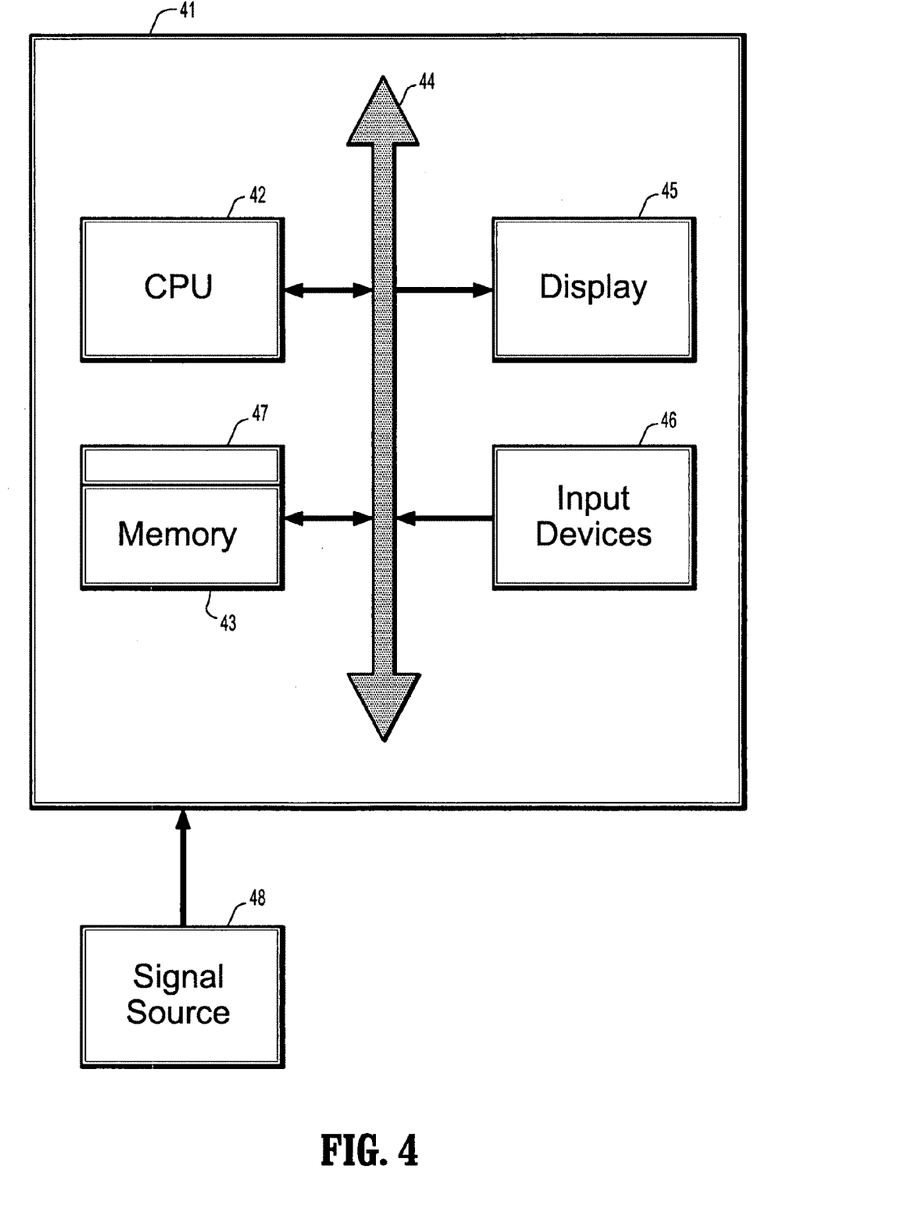
FIG. 4 is a block diagram of an exemplary computer system for implementing an in-context MPR visualization method, according to an embodiment of the invention.

FIG. 4 is a block diagram of an exemplary computer system for implementing an in-context MPR visualization method, according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of fusing a multi-planar reconstruction of a digitized medical image with a volume rendering of a digitized medical image comprising the steps of:

providing a digitized medical image volume, said image comprising a plurality of intensities on a 3-dimensional grid of points;

providing a planar region inside said image volume in which a multi-planar reconstruction (MPR) will be rendered in a first rendering pass;

sampling the neighborhood about each point in said planar region wherein a color value for each said point and a depth of each said point within the image volume are saved in a buffer, wherein said MPR is rendered into said buffer;

providing a projection plane comprising a 2-dimensional lattice of points onto which rendering rays are projected from a viewing point through said image volume, to render said image volume in a second rendering pass;

advancing a sampling point along a ray through said image volume;

computing a depth of said sampling point in said image volume;

determining for a sampling point on a ray that penetrates said planar region if a depth of said sampling point is less than the buffer depth of a corresponding point in said planar region and sampling a neighborhood of points about such a sampling point;

determining if said sampling point is near said planar region, wherein a first transfer function is applied to a sample value interpolated from a first volume if said sampling point is close to or inside the planar region, and a second transfer function is applied to a sample value interpolated from a second volume if said sampling point is not close to the planar region; and accumulating the output of the transfer function at a point on said projection plane, wherein said image volume is rendered and fused with the MPR from said first rendering pass.

2. The method of claim 1, wherein sampling the neighborhood about each point in said planar region comprises tri-linear interpolation.

3. The method of claim 2, further comprising window leveling said interpolated sample values.

4. The method of claim 3, further comprising if a leveled luminosity of said sampled point is lower than a pre-determined threshold, and discarding any such sampling points from the multi-planar reconstruction.

5. The method of claim 1, wherein sampling a neighborhood of points about a sampling point whose depth is less than the buffer depth of a corresponding planar point comprises tri-linear interpolation.

6. The method of claim 1, further comprising discarding a sampling point whose depth is greater than the buffer depth of the corresponding planar point.

7. The method of claim 1, further comprising performing shading on the outputs of said transfer functions.

8. A method of fusing a multi-planar reconstruction of a digitized medical image with a volume rendering of a digitized medical image comprising the steps of:

providing a first digitized medical image volume, said image comprising a plurality of intensity data on a 3-dimensional grid of points;

providing a planar region inside said first image volume in which a multi-planar reconstruction (MPR) will be rendered;

computing a depth for each point in said planar region and saving said depth value in a buffer associated with said planar region, wherein said MPR of said first image volume is rendered into said buffer;

providing a second digitized medical mage volume, said image comprising a plurality of intensity data on a 3-dimensional grid of points;

embedding said planar region from said first image volume within said second image volume;

volume rendering said second digitized image volume, wherein a plurality of rays are projected from a viewing point through said second image volume wherein a sample output for sampling points along each ray is accumulated on a projection plane, determining, for each sampling point along each ray, whether said sampling point is near said planar region, wherein said sampling point is rendered with a first transfer function applied to first image data if said sampling point is close to or inside the planar region, and said sampling point is rendered with a second transfer function applied to second image data if said sampling point is not close to the planar region, wherein said volume rendering of said second volume is fused with said MPR rendering of said first volume.

9. The method of claim 8, further comprising determining for each sampling point along each ray that penetrates said planar region if a depth of said sampling point is less than the buffer depth of a corresponding point in said planar region and discarding a sampling point that does not satisfy said criteria.

10. The method of claim 8, wherein said first image volume and said second image volume are acquired using differing imaging modalities.

11. The method of claim 8, wherein said first image volume is acquired before performing a medical procedure, and said second image volume is acquired after performing said medical procedure.

12. The method of claim 8, further comprising for a sampling point near to said planar region, rendering said sampling point with a third transfer function applied to second image data.

13. The method of claim 8, further comprising interpolating an output on the boundary of said planar region with said second image volume from the output of said first transfer function and the output of the second transfer function.

14. A program storage device readable by a computer, tangibly embodying a program of instructions executable by the computer to perform the method steps for fusing a multi-planar reconstruction of a digitized medical image with a volume rendering of a digitized medical image comprising the steps of:

providing a digitized medical image volume, said image comprising a plurality of intensities on a 3-dimensional grid of points;

providing a planar region inside said image volume in which a multi-planar reconstruction (MPR) will be rendered in a first rendering pass;

sampling the neighborhood about each point in said planar region wherein a color value for each said point and a depth of each said point within the image volume are saved in a buffer, wherein said MPR is rendered into said buffer;

providing a projection plane comprising a 2-dimensional lattice of points onto which rendering rays are projected from a viewing point through said image volume, to render said image volume in a second rendering pass;

advancing a sampling point along a ray through said image volume;

computing a depth of said sampling point in said image volume;

determining for a sampling point on a ray that penetrates said planar region if a depth of said sampling point is less than the buffer depth of a corresponding point in said planar region and sampling a neighborhood of points about such a sampling point;

determining if said sampling point is near said planar region, wherein a first transfer function is applied to a sample value interpolated from a first volume if said sampling point is close to or inside the planar region, and a second transfer function is applied to a sample value interpolated from a second volume if said sampling point is not close to the planar region; and accumulating the output of the transfer function function at a point on said projection plane, wherein said image volume is rendered and fused with the MPR from said first rendering pass.

15. The computer readable program storage device of claim 14, wherein sampling the neighborhood about each point in said planar region comprises tri-linear interpolation.

16. The computer readable program storage device of claim 15, the method further comprising window leveling said interpolated sample values.

17. The computer readable program storage device of claim 16, the method further comprising if a leveled luminosity of said sampled point is lower than a pre-determined threshold, and discarding any such sampling points from the multi-planar reconstruction.

18. The computer readable program storage device of claim 14, wherein sampling a neighborhood of points about a sampling point whose depth is less than the buffer depth of a corresponding planar point comprises tri-linear interpolation.

19. The computer readable program storage device of claim 14, the method further comprising discarding a sampling point whose depth is greater than the buffer depth of the corresponding planar point.

20. The computer readable program storage device of claim 14, the method further comprising performing shading on the outputs of said transfer functions.

* * * * *